Jan. 5, 1932.  E. H. MECHLING ET AL  1,839,243
CASING FLOATER
Filed March 28, 1927   8 Sheets-Sheet 2
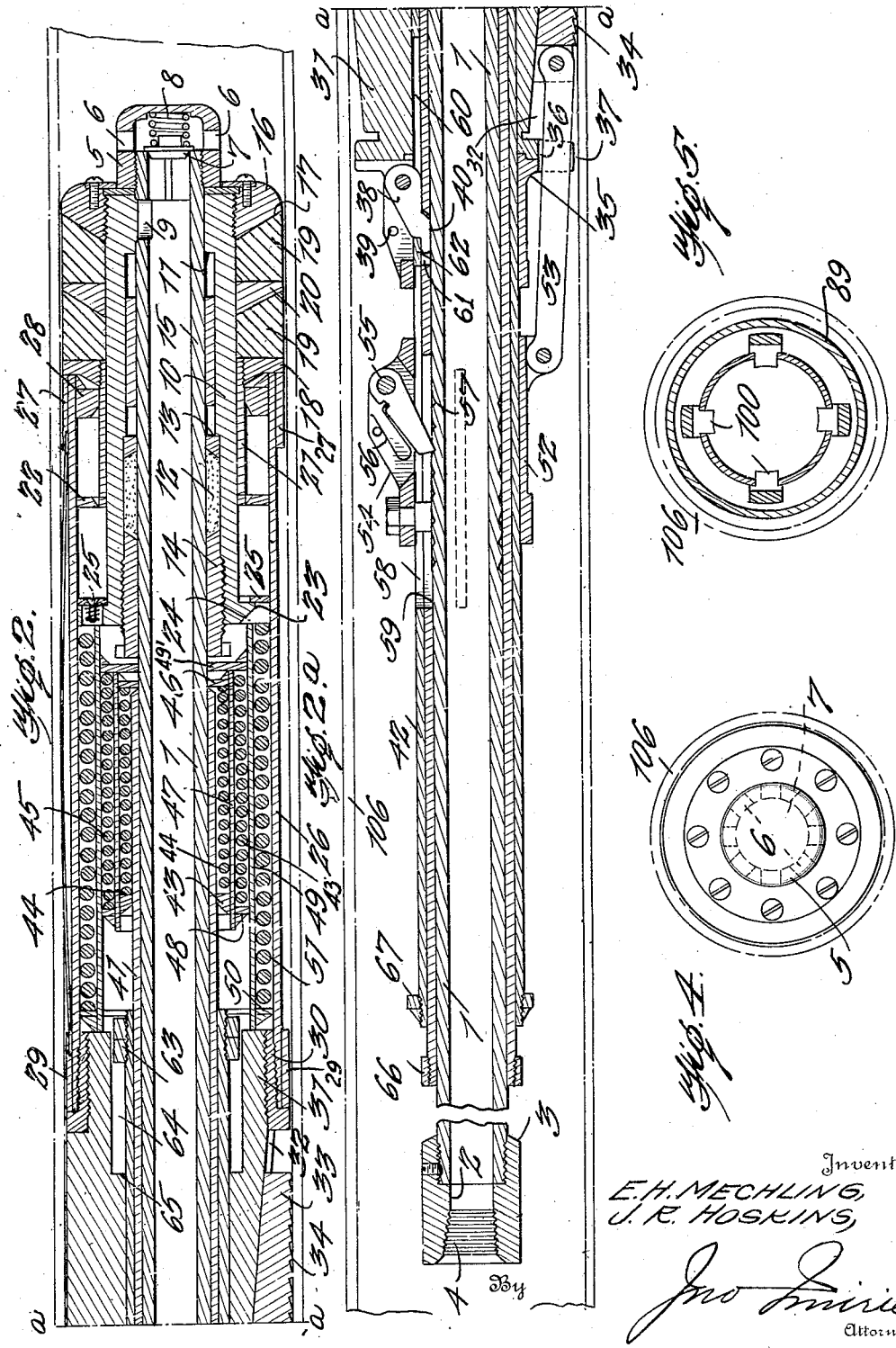
Inventors
E. H. MECHLING,
J. R. HOSKINS,
By
Attorney

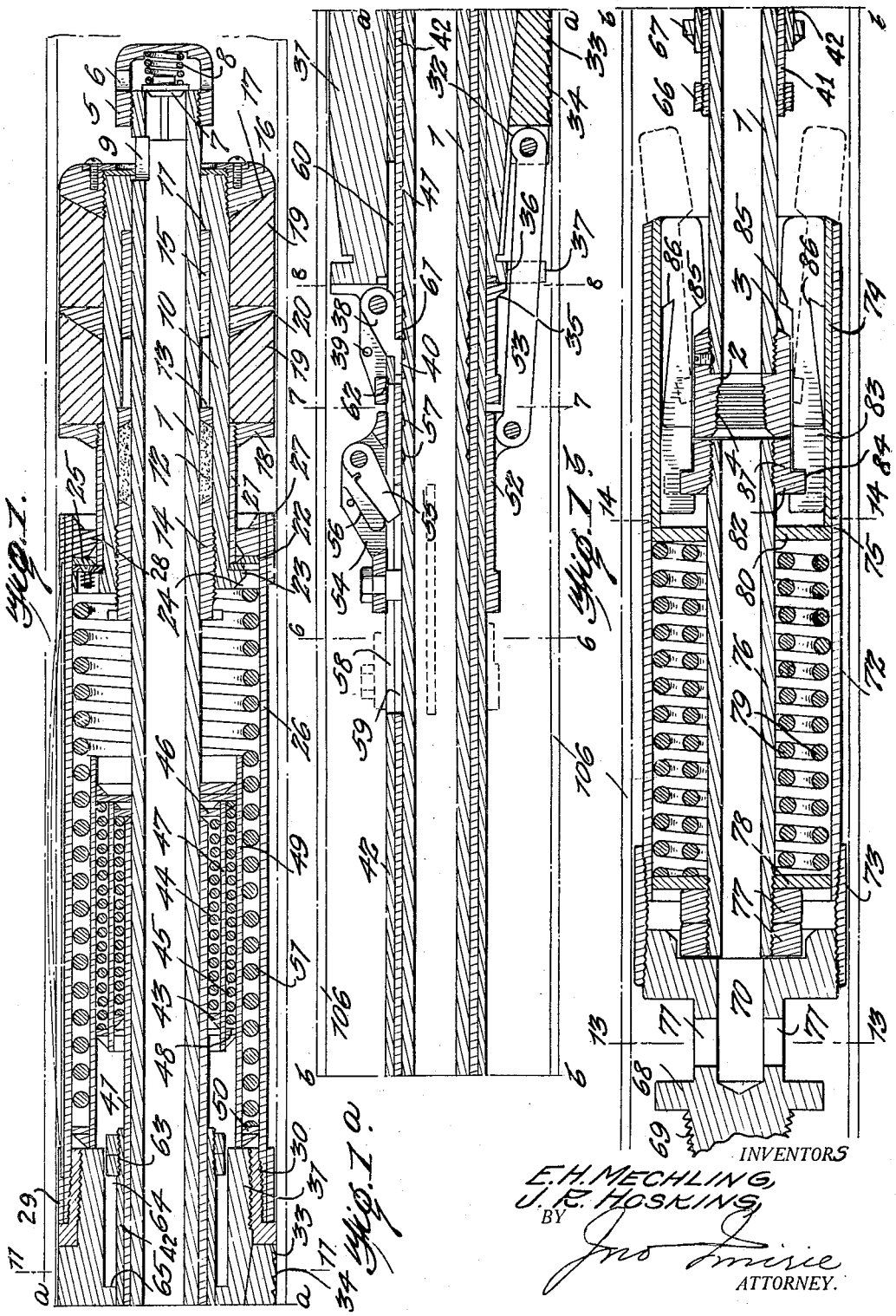

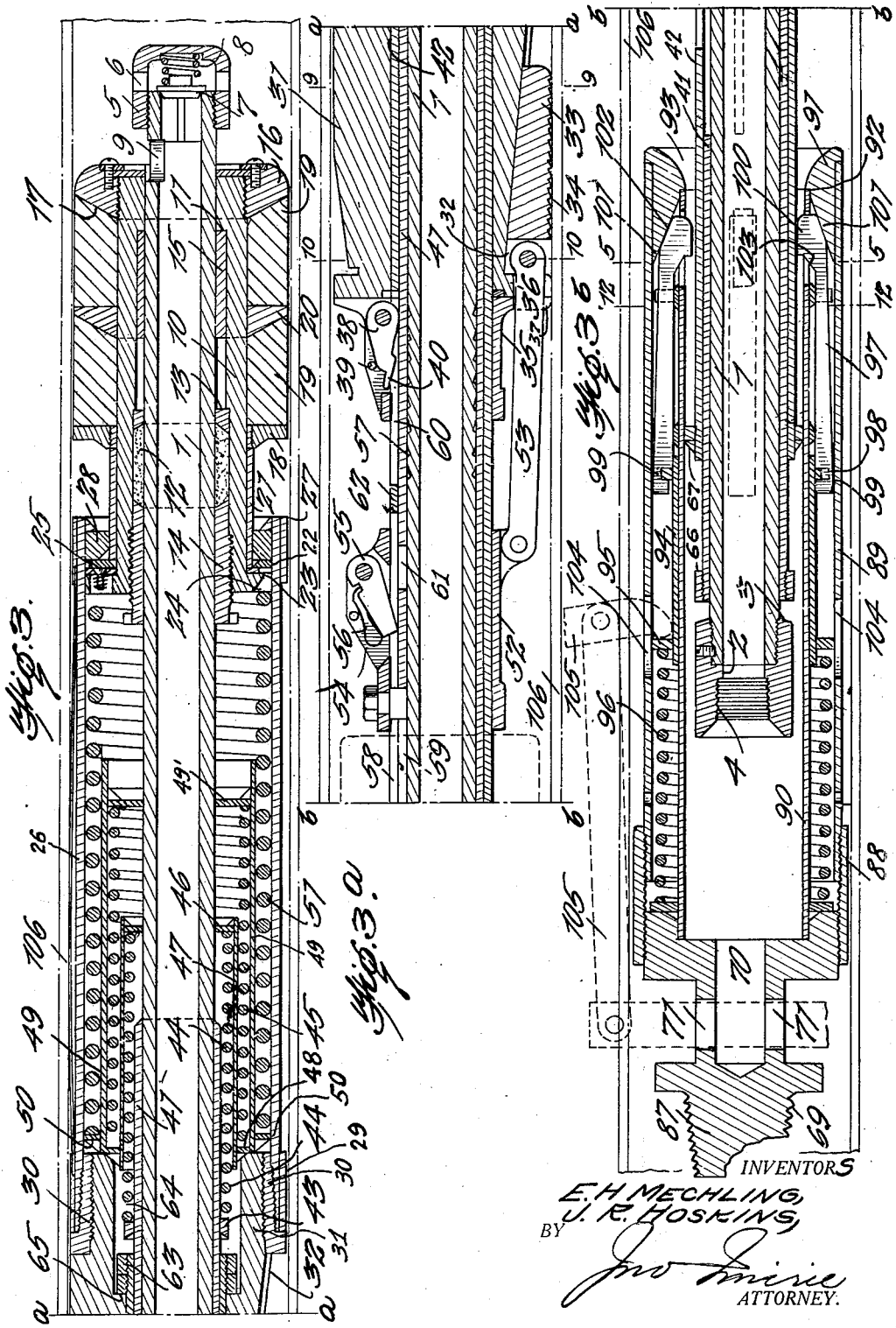

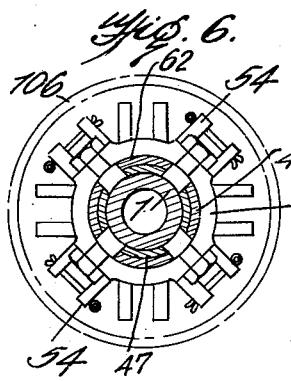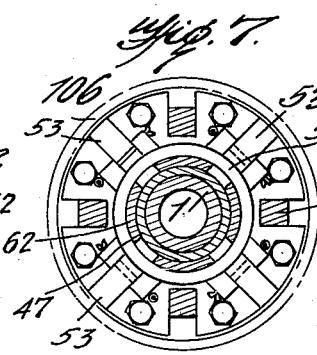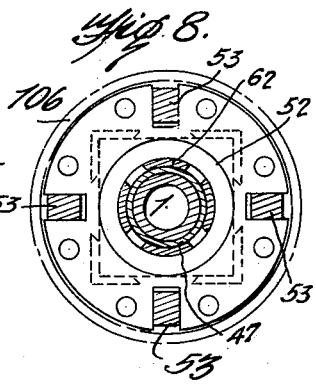
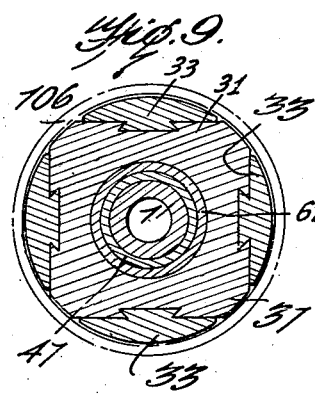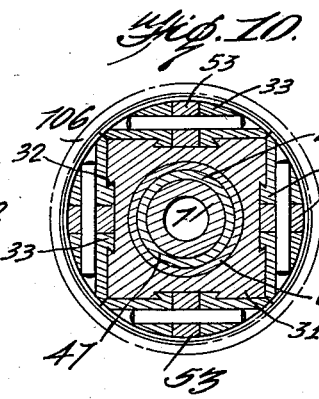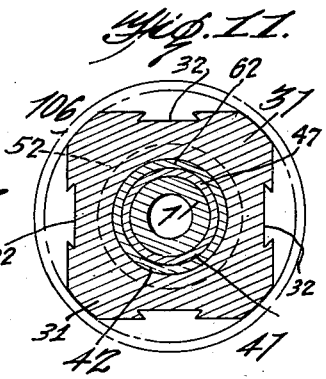
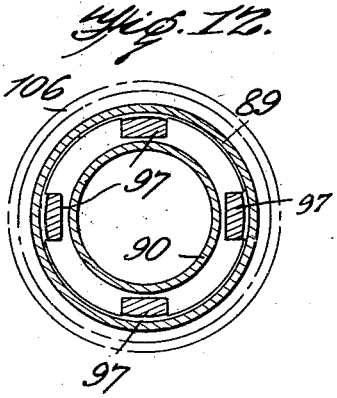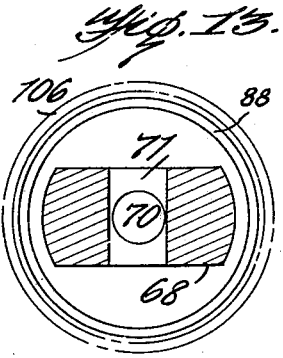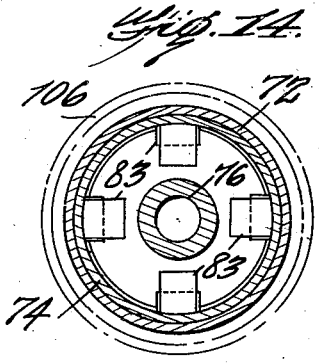

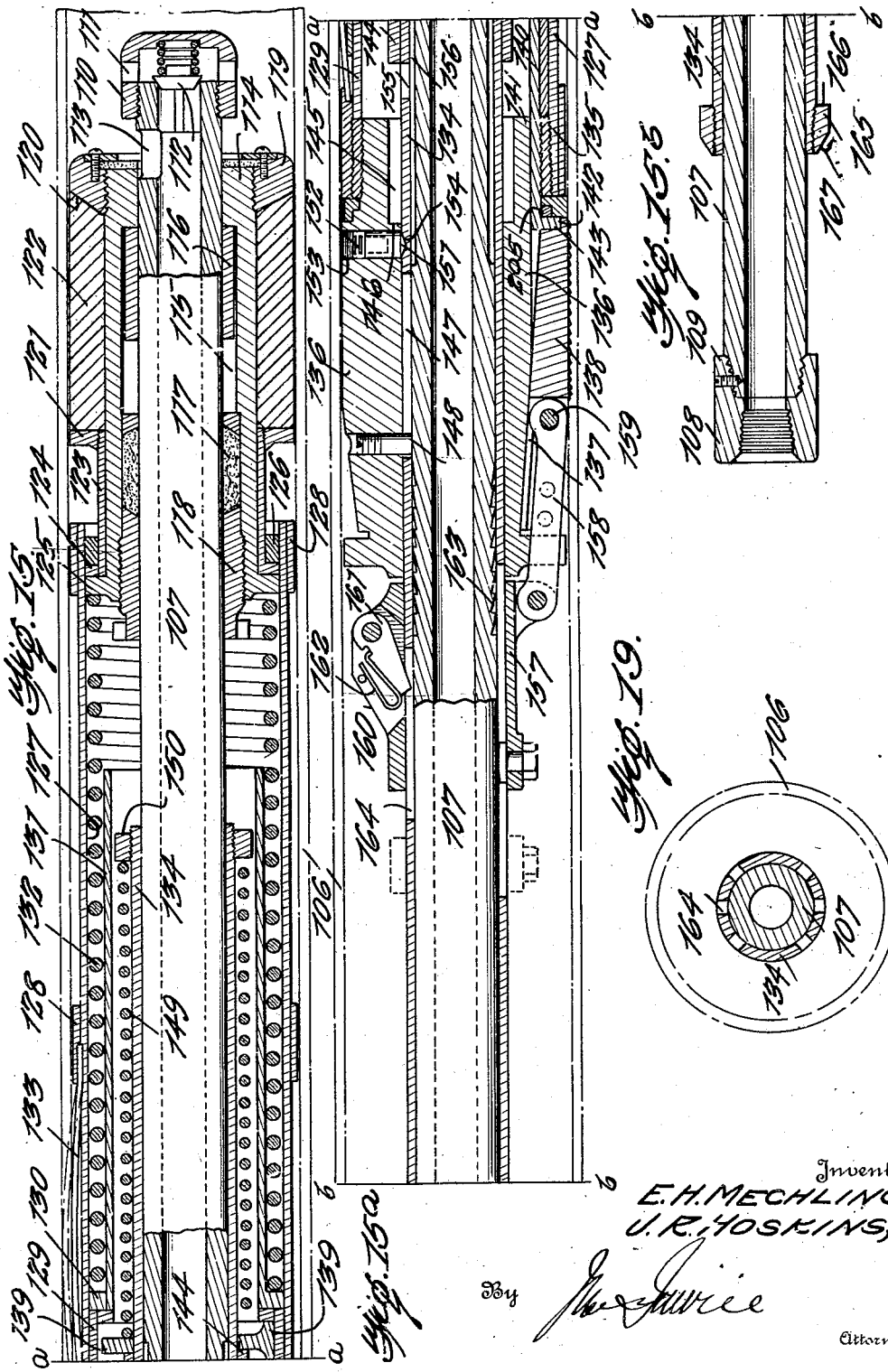

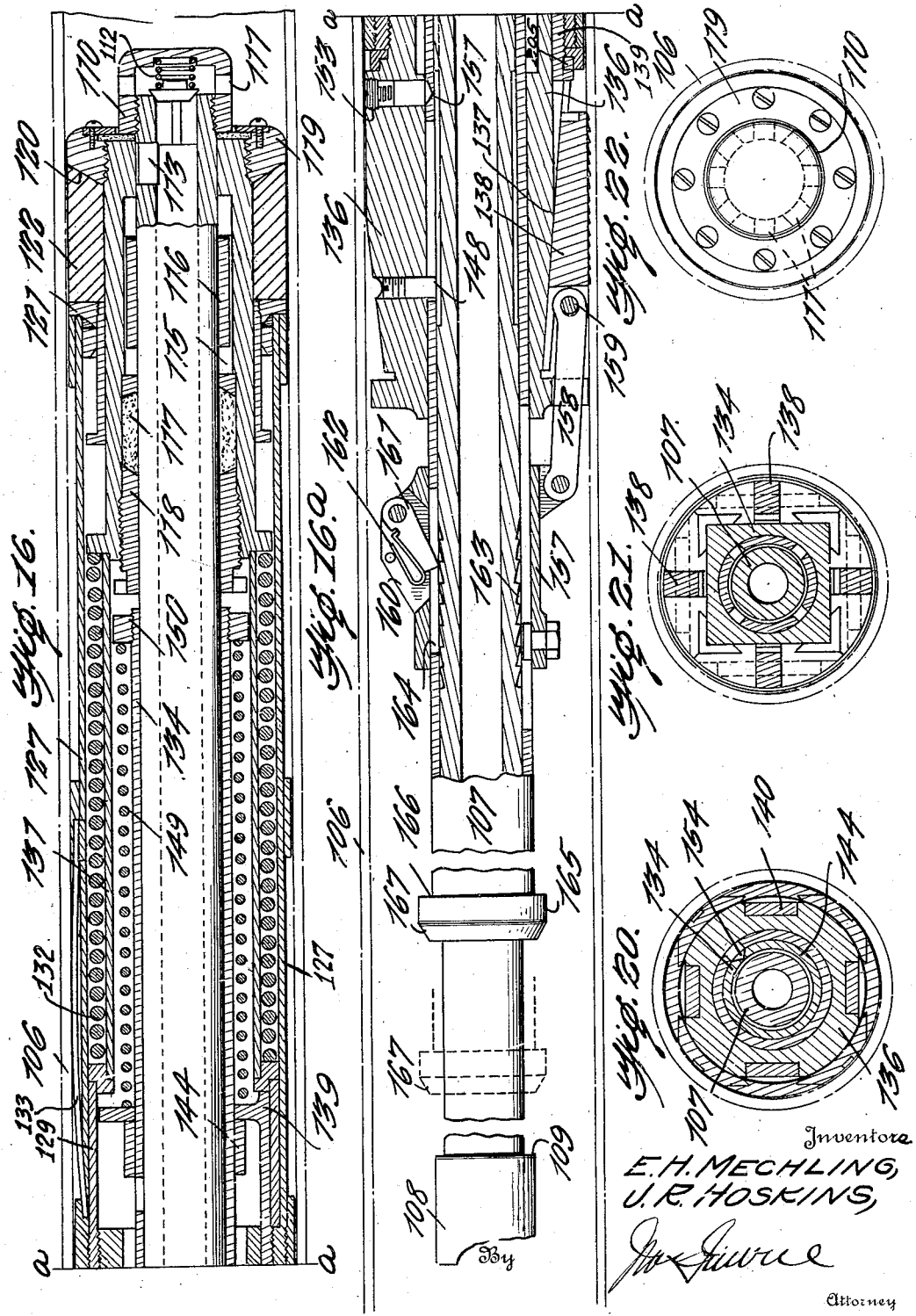

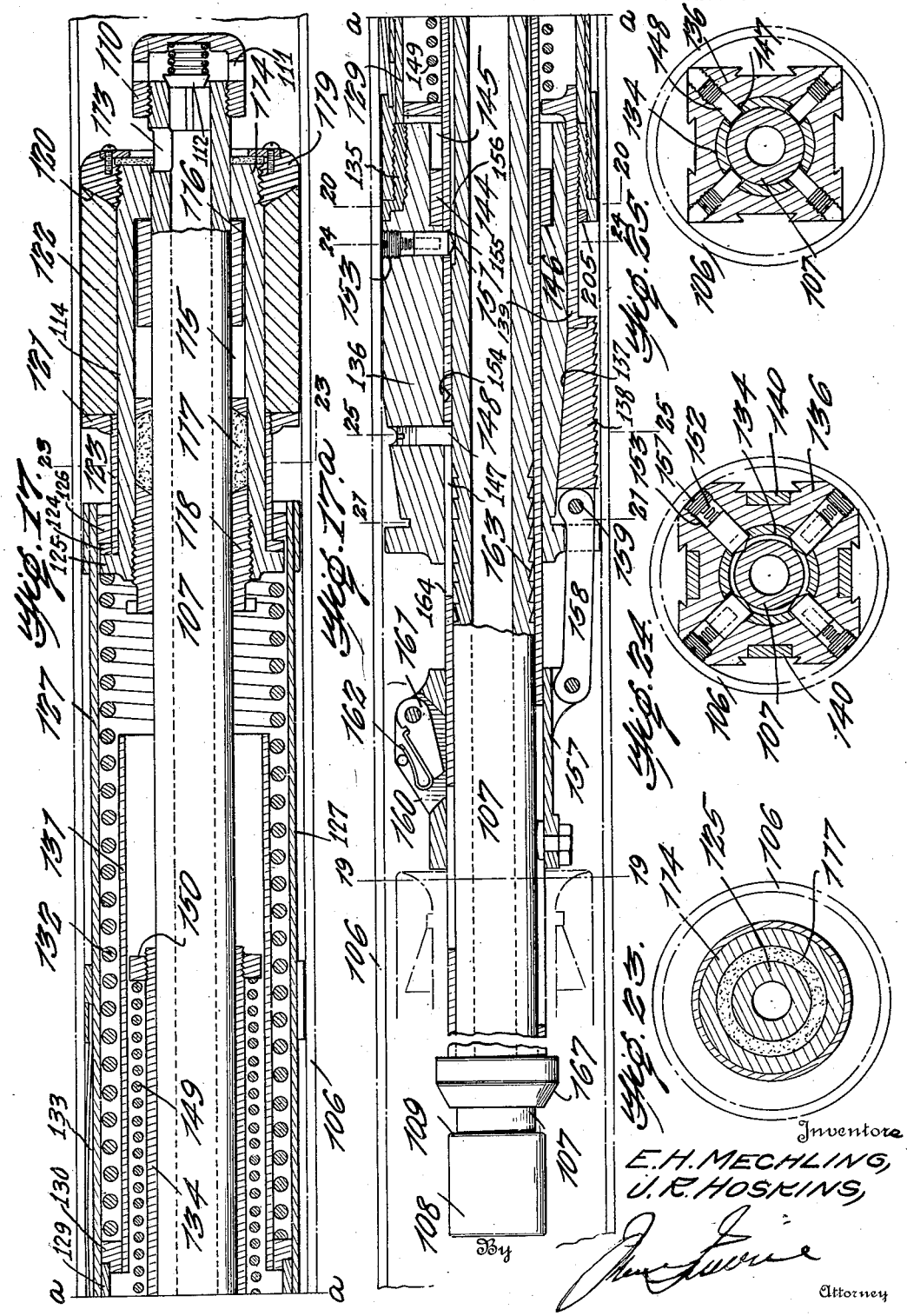

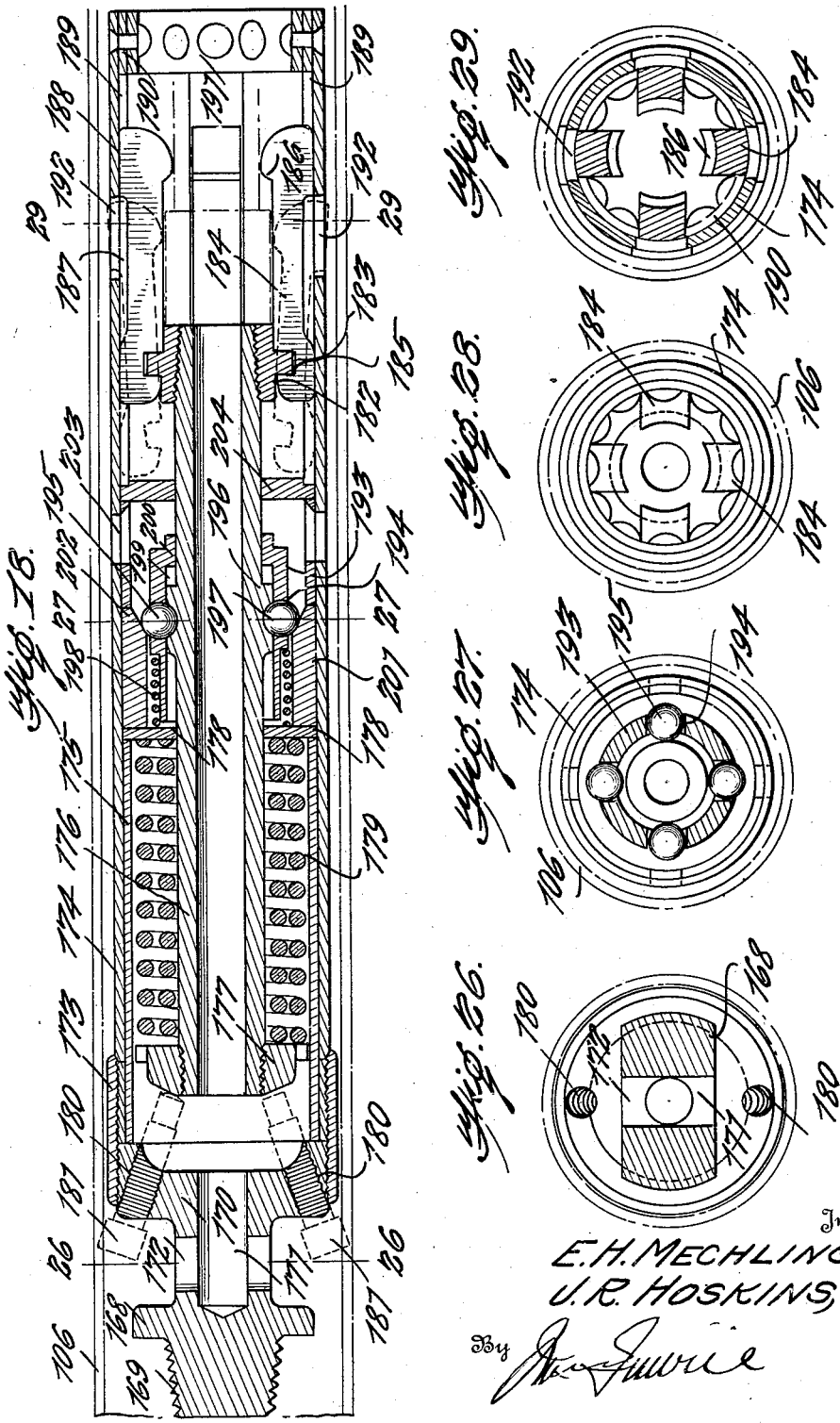

Patented Jan. 5, 1932

1,839,243

UNITED STATES PATENT OFFICE

ELI H. MECHLING, OF LIMA, OHIO, AND JOHN R. HOSKINS, OF BARTLESVILLE, OKLAHOMA

CASING FLOATER

Application filed March 28, 1927. Serial No. 179,105.

This invention is directed to a well casing floater which may be applied and withdrawn at will and which, when in position, serves to take advantage of the flotation effect of water to assist in removing or placing a string of casing from or into a well.

The primary object of the present invention is the provision of a floater designed more particularly to be both positioned and withdrawn by means of appropriate tools on the usual cable with the floater provided with means for sealing the juncture between the casing and floater and with further means for holding the floater fixed against upward or downward movement with respect to the casing, combined with means whereby the floater sealing means and floater gripping means are automatically controlled at will and held in both operative and inoperative positions wholly independent of the movement of the floater, whereby such floater may be readily lowered to the desired position in the casing and as readily removed from the casing without interference from either the sealing or gripping means.

A further object of the invention is the provision of a floater in which the fluid in the well may readily pass through the floater during the placing of the latter, with means for cutting off the flow through the floater when the latter has been finally placed in sealing and gripping cooperation with the casing.

A further object of the invention is the provision of means whereby, following the placing of the floater in sealing and gripping cooperation with the casing, water may be delivered through the floater from above and held against return flow through the floater to provide artificial flotation effect on the floater, particularly when pulling an inner string of casing from a well where there is little or no water, or where it is impossible to get water column or pressure from the outside of casing.

A further object of the invention is the provision of a floater in which and through which water may be pumped to utilize the flotation effect of such water and at the same time permit the water so delivered through the floater to reach around the outer edge of the casing sections to wash the sand and mud from the joints.

A further object is the provision of a placing tool which is engaged with the floater and utilized to lower the floater to the desired position in the casing and thereafter operate the floater to seal and lock it with respect to the casing, the placing tool being constructed to permit its automatic disengagement with the floater following the placement of the latter in the desired position.

A further object of the invention is the provision of a removing tool adapted to automatically engage the placed floater and capable in operation of automatically releasing the floater from its sealing and gripping cooperation with the casing to thereafter permit the floater to be withdrawn from the casing by means of the removing tool.

The invention is illustrated in the accompanying drawings, in which:

Figures 1, 1ª and 1ᵇ together constitute a a longitudinal sectional view of the floater and cooperating placing tool through which the floater is lowered to the desired position and by means of which the floater is placed in sealing and gripping cooperation with the casing, the relation of the views being such that Figure 1ª is placed at the left of Figure 1 and Figure 1ᵇ is placed at the left of Figure 1ª.

Figures 2 and 2ª together constitute a longitudinal sectional view showing the floater in sealed and gripping cooperation with the casing, the placing tool having been removed, Figure 2ª being placed at the left of Figure 2 to complete the view.

Figures 3, 3ª and 3ᵇ together constitute a longitudinal sectional view showing the floater as released by the removing tool, the latter being shown in cooperation with the floater preparatory to removing the floater from the casing, the views being assembled by placing Figure 3ª to the left of Figure 3 and Figure 3ᵇ to the left of Figure 3ª.

Figure 4 is a bottom end view of the floater.

Figure 5 is a section on line 5—5 of Figure 3ᵇ.

Figure 6 is a section on line 6—6 of Figure 1ª.

Figure 7 is a section on line 7—7 of Figure 1ª.

Figure 8 is a section on line 8—8 of Figure 1ª.

Figure 9 is a section on line 9—9 of Figure 3ª.

Figure 10 is a section on line 10—10 of Figure 3ª.

Figure 11 is a section on line 11—11 of Figure 1.

Figure 12 is a section on line 12—12 of Figure 3ᵇ.

Figure 13 is a section on line 13—13 of Figure 1ᵇ.

Figure 14 is a section on line 14—14 of Figure 1ᵇ.

Figures 15, 15ª and 15ᵇ together constitute a longitudinal sectional view of a slightly different form of floater, the relation of views being such that Figure 15ª is to be placed to the left of Figure 15 and Figure 15ᵇ is to be placed at the left of Figure 15ª.

Figures 16 and 16ª together constitute a longitudinal sectional view of the modified form of floater, showing the floater in sealed and gripping cooperation with the casing, Figure 16ª being placed at the left of Figure 16 to complete the view.

Figures 17 and 17ª together constitute a longitudinal sectional view of the modified floater, showing the same as released by the removing tool, the view being assembled by placing Figure 17ª at the left of Figure 17.

Figure 18 is a view of a slightly modified form of placing tool.

Figure 19 is a section on line 19—19 of Figure 17ª.

Figure 20 is a section on line 20—20 of Figure 17ª.

Figure 21 is a section on line 21—21 of Figure 17ª.

Figure 22 is a bottom end view of the floater.

Figure 23 is a section on line 23—23 of Figure 17.

Figure 24 is a section on line 24—24 of Figure 17ª.

Figure 25 is a section on line 25—25 of Figure 17ª.

Figure 26 is a section on line 26—26 of Figure 18.

Figure 27 is a section on line 27—27 of Figure 18.

Figure 28 is a bottom plan view of the placing tool.

Figure 29 is a section on line 29—29 of Figure 18.

In the following description, the floater shown in Figures 1 to 3ᵇ, inclusive, will first be described, then a description of the placing tool for such floater will be given, and following this the removing tool which is common to both types of floaters will be described, then the description will take up in detail the modified form of floater and the modified form of placing tool to cooperate therewith.

The floater

The floater comprises an elongated sleeve-like section 1, hereinafter termed the driving sleeve, provided at its upper end with a driving collar 2 threaded onto the end of the sleeve and fixed against disconnection and presenting an annular inclined shoulder 3 about the sleeve at the lower end of the collar. The collar above the sleeve is internally threaded at 4 with a left hand thread to permit the connection of tubing to and in alignment with the sleeve when necessary for purposes which will later appear.

The lower end of the sleeve is provided with a cap 5, the side wall of which beyond the end of the sleeve is formed with openings 6. A downwardly opening valve 7 is arranged to cooperate with the lower end of the sleeve 1 and is held closed in the absence of pressure from within the sleeve by a spring 8 bearing between the cap and valve. The sleeve 1 immediately above the cap 5 is formed with an opening 9, hereinafter termed the sleeve outlet.

A packing carrier 10 of sleeve-like form encircles the driving sleeve near the lower end, this carrier being interiorly spaced from the sleeve throughout its length except at the lower end where its interior diameter is reduced for a sliding fit on the sleeve providing a shoulder 11 at the lower end of the packing carrier and interiorly thereof. To prevent fluid leakage between the packing carrier and driving sleeve above the shoulder 11, suitable packing 12 is arranged to bear upon a ring seating in a recess 13 in the packing carrier, with such packing held in suitable form by a gland 14 cooperating with the packing carrier.

The driving sleeve between the packing 12 and the shoulder 11 of the packing carrier is formed integrally or provided with a rigidly secured annular member 15 constituting and hereinafter referred to as a driving flange, the function of which is to engage the shoulder 11 to depress the packing carrier in certain operations of the packer. A nut-like member 16 is threaded on the lower end of the packing carrier with a downwardly and outwardly sloping surface 17 beyond the packing carrier between which surface and a retainer 18 encircling the packer above the nut there are arranged the packing rubbers 19 in the use of which the floater is placed in sealing cooperation with the casing. These packing rubbers are preferably annular rubber bodies which, when subjected to endwise compression, result in an increase in diameter to effect a sealing operation and preferably, though not necessarily, are here shown as divided with an interposed washer 20 to increase the resistance of the water between the rubbers and the casing.

The retainer 18 at the upper ends of the rubbers is of course mounted for relative movement on the packing carrier in order to insure the spreading of the rubbers, such retainer for this purpose being threaded upon the lower end of an annular or sleeve-like spacer 21 which slidably encircles the packing carrier and is provided at its upper end with a lateral flange 22. The upper end of the packing carrier above the lateral annular flange 22 of the spacer has an annular flange 23 formed with openings 24 controlled by downwardly opening spring-pressed valves 25 serving to prevent the too rapid escape of fluid which may accumulate between the carrier and exterior spring sleeve to be later described.

A cylindrical spring sleeve 26 encircles the upper end of and extends above the carrier, such sleeve being exteriorly reinforced at 27 and interiorly provided at its lower end with a flange 28 to underlie the flange 23 on the carrier and act as a limit for the movement of the carrier in one direction. The spring sleeve 26 extends materially above the carrier and is exteriorly reinforced at 29 at its upper end and interiorly provided, through threaded cooperation, with a bushing 30 within which is threaded the lower end of what will be termed the floater body 31. This body encircles the driving sleeve and is formed with diametrically opposed pairs of vertically ranging slots or channels 32, the inner or vertical walls of which are inwardly and upwardly inclined. It is apparent that the floater body may be directly secured to the spring casing if desired. The provision of the bushing 30, however, provides a convenient machining of the slots, as they may be cut directly through the body from end to end while the bushing forms an abutment at the lower ends of the slots.

Slidably mounted in each slot 32 is a gripper 33 in the form of a metallic section having its inner wall inclined in correspondence with the upright wall of the slot and its outer surface roughened or serrated or otherwise formed at 34 so that it may bite into the casing of the well and thus act to fit the floater against relative movement in the casing. Removably secured to the upper end of the floater body 31 is a cylindrical extension or casting 35 having adjacent the body 31 an extended flange 36 formed with pairs of diametrically opposed guide slots 37 for a purpose which will later appear. Above the flange 37, the body extension 35 is formed with a plurality of dogs 38 pivotally supported in the extension and held against undue outward movement by pins 39 bridging the slots in which the logs are mounted. The noses or operative ends of the dogs have projections 40 by which the dogs are temporarily held in locked position.

Mounted for sliding movement directly on the driving sleeve is what may be termed a spring trip sleeve 41 and slidably encircling and bearing directly upon the spring trip sleeve is what may be termed a main trip sleeve 42. The spring trip sleeve extends below the main trip sleeve and is provided above its lower end with a fixed collar 43 adapted to be operated by a spring under certain conditions to lift the sleeve. In order that the desired effect of the spring be provided for without undue length of spring and therefore increased over-all length of the floater, such spring is arranged in inner and outer sections 44 and 45, the former encircling the spring trip sleeve and bearing at its upper end against the collar 43 and at its lower end against a flange 46 carried by a spacing sleeve 47 arranged between the spring sections and provided at its upper end with a flange 48 beneath which the upper end of the outer spring section 45 bears, the lower end of the outer spring section bearing on a flange 49' or ring carried by and projecting inwardly from a retaining sleeve 49 which extends longitudinally above and below the spring length and between the outer spring section 45 and the spring sleeve 26.

The retaining sleeve 49 is formed at its upper end with an outwardly extending flange 50 between which flange and the flange 23 on the carrier, and housed between the spring sleeve 26 and the retaining sleeve 49, is a coil spring 51. This spring is comparatively heavy and serves to hold the floater body in raised position and it is to be particularly noted that this spring, which will be hereinafter termed the main spring, is of such inherent tension that more force is required to compress it than is required to lift the floater per se. Therefore, if the floater is free to move in the casing, it is apparent that the main spring will not be compressed.

Slidably mounted upon the main trip sleeve 42 above the body extension 35 is a gripper operator 52 arranged in the form of a sleeve or cylindrical extension and pivotally supporting links 53 which depend toward and are pivotally connected to the respective grippers 33, passing through the guide slots 37. Mounted in slots 54 in the gripper operator, preferably arranged in diametrically opposed pairs, are pawls 55 normally influnced to operative position by springs 56. The driving sleeve 1 is formed with serrations or ratchet recesses 57 with which the pawls cooperate. These ratchet recesses or racks are offset vertically so that at least two of the pawls are always in position to engage one of the racks.

The pawls 55 operate through slots 58 in the main trip sleeve and slots 59 in the spring trip sleeve. The dogs 38 on the floater body extension 35 operate through slots 60 in the main trip sleeve and engage in recesses 61 in the spring trip sleeve, so as to hold this sleeve in fixed relation to the floater body as long as the dogs are in operative position. When the dogs are inoperative, that is when the floater is being set or in sealing and gripping cooperation with the casing, the dogs 38 are held against release movement by a section 62 of the main trip sleeve which overlies the dog projections 40 and prevents outward movement of the dogs. It is, of course, understood that when the main trip sleeve is operated, as will later appear, the dogs are relieved of this holding action and on relatively upward movement of the spring trip sleeve, the dogs will be forced from holding cooperation with that sleeve, as for example by forming the meeting edges of the dog and sleeve recess on an inclination as indicated.

The main trip sleeve terminates above the lower end of the spring trip sleeve and is terminally provided or formed with collars 63 which are arranged to operatively cooperate with the floater body 31, the latter being interiorly recessed at 64 to permit limited movement of the collars before engaging the body through contact with the shoulder 65 formed at the upper end of the recessed portion 64. The upper end of the spring trip sleeve has an annular collar or projection 66 and the upper end of the main trip sleeve is also provided with a collar 67, the latter, however, being below the collar of the spring trip sleeve and having an external diameter exceeding that of the collar 66.

An important detail of the present invention resides in the provision of what will be termed friction slides which comprise elongated spring strips 67' secured at their respective ends to the outer surface of the spring sleeve 26. These friction slides, which are provided in appropriate number, are so tensioned as to normally present at their area of maximum projection beyond the sleeve a diameter exceeding that of the casing in which the floater is to be placed. As an obvious result, these friction slides will be compressed to be tensioned when the floater is positioned to thereby exert a binding action between the floater and casing. The slides are designed particularly to support the weight of the floater within the casing and thereby prevent the floater from falling if the other parts serving this end should fail to function. For example, if the ratchets 55 fail to catch the driving sleeve and hold it in elevated position, the floater would, in the absence of other supporting means, fall to the bottom of the casing and thereby be difficult if not imposible to remove. With the friction slides, however, under tension to a degree sufficient to support the floater, the latter could not fall and if the locking parts failed to function, such floater could be easily fished to the surface for repair or for other correction. It will, of course, be understood that the slide and size and tension and also the number of the friction slides may be designed with a view to the proportions and weight of the particular floater and that so long as the slides serve to support the weight of the floater when in the casing, the detailed construction and arrangement of the slides are not important.

The placing tool

The floater just described is primarily and particularly designed to be operated both in placement in the casing and withdrawal from the casing by the usual cable, and in order that the floater parts may be properly operated in the placement of the floater, a particular placing tool is required. This tool is shown as connected with the floater in Figures 1, 1ª and 1ᵇ, being, however, illustrated particularly in Figure 1ᵇ.

The placing tool comprises a connector 68 in the form of a casting arranged at 69 for connection to the cable and formed with a longitudinal bore 70 passing through a reduced neck of the connector and having lateral outlets 71 through such neck. A pipe section 72 is removably joined to the connector 68 by a coupling 73, the lower portion of the pipe section having an interior sleeve 74 forming an abrupt shoulder 75 interiorly of the pipe section and intermediate its ends. The placing tool also includes a tubular member 76 approximately corresponding in diameter to the driving sleeve 1 of the floater, this tubular member constituting a fluid conduit between the driving sleeve and the bore of the connector during the placing operation as will later appear.

The upper end of the tubular member is provided with nuts 77 threaded thereon below which there is provided a disk washer 78 encircling the tubular member and forming an upper limit or bearing member for springs 79 preferably arranged in inner and outer sections, which springs bear at their lower ends upon a disk washer 80 resting upon the shoulder 75. The lower end of the tubular member 76 is provided below the disk washer 80 with a nipple 81 having an upper laterally extending flange 82.

Locking dogs 83 are carried by the flange 82, being recessed at 84 to cooperate with the flange and formed on their inner edges with shoulders 85 adapted, when the placing tool is connected to the floater, to engage beneath the inclined shoulder 3 of the driving collar 2. The locking dogs 83 approximate the length of the sleeve 74, and said dogs below the shoulders 85 have a width approximating the distance between the driving sleeve 1 of the floater and the sleeve 74 of the placing tool, so that when the parts are in the connected relation, the sleeve 74 acts to hold the locking levers in such position that their shoulders 85 will engage beneath the inclined shoulder 3 of the driving collar 2.

The outer edges of the locking dogs are, however, recessed at 86, thereby materially reducing the width of the dogs in transverse line with such recess. Obviously, if the lower edge of the pipe section 72 and sleeve 74 are moved upwardly, as will be permitted on compression of spring 79, the locking dogs are permitted to move outwardly at their lower ends and thus free the connection between such dogs and the driving collar, the relative inclination of the shoulder 3 and shoulders 85 facilitating this disconnection.

*The removing tool*

The removing tool is arranged to cooperate with the main trip sleeve and this tool is shown more particularly in connection with Figures 3, 3ª and 3ᵇ, the tool itself being illustrated in Figure 3ᵇ. The removing tool is designed to be lowered into the casing by the usual cable and to automatically engage with the main trip sleeve, that is, below the collar 67 on said sleeve.

This removing tool comprises a connector 87 similar to the connector 68 of the placing tool to which, through a coupling 88, is secured a pipe section 89. The connector is bored to receive a guide sleeve 90 extending longitudinally of and spaced from the pipe section 89. The lower end of the pipe section 89 is provided with an annular member 91 recessed at 92 to receive the lower edge of the guide sleeve 90, the annular member below the recess being flared at 93 to guide the removing tool over the main trip sleeve, which latter will be thereby guided within the guide sleeve 90 as the removing tool is lowered over the floater.

A dog operating sleeve 94 is slidably mounted on the guide sleeve 90 and is provided at its upper end with an outstanding flange 95 between which and the lower end of the connector is arranged a coil spring 96. Locking dogs 97 are carried by the operating sleeve, said dogs being formed at their upper ends with recesses 98 to cooperate with a flange 99 on the operating sleeve, the lower ends of the dogs passing through slots in the guide sleeve and having engaging ends 100 to engage beneath the collar 67 on the main trip sleeve. The annular member 91 is formed above the recess 92 with an inclined surface 101 engaging a corresponding surface 102 on the dogs, thereby permitting outward movement of the hook ends of the dogs riding over the collar 67 in positioning the removing tool, the spring 96 thereafter operating to move the dogs downwardly with respect to the inclined surface 101 and thereby force and hold the dogs in position to engage the collar 67 on the main trip sleeve.

If desired, the dogs 97 may be formed on their inner edges with inclined sections 103 which, in operation, are engaged by the upper edges of the slots in the guide sleeve through which the dogs pass in order to assist in forcing the dogs into an inoperative position when passing over the collar 67 on the main trip sleeve. The pipe section 89 is formed with longitudinal openings 104 through which a tool may be introduced indicated generally at 105 and forming no particular part of this invention, by which the dog operating sleeve may be moved upwardly against the tension of the spring 96 to permit the dogs 97 to release or pass by the collar 67 on the main trip sleeve and thereby disconnect the removing tool from the floater.

*Operation*

Assuming the placing tool connected to the floater as described and the floater in normal condition which is with the spring trip sleeve locked by the dogs 38 relative to the floater body 31, the main trip sleeve freely movable vertically, the gripper operator freely movable vertically, and the main spring extended, with the rubbers 19 in non-compressed condition and the grippers 33 freely slidable in the slots 32 in the floater body 31. The floater and placing tool are lowered in the casing indicated at 106 to the desired point. During this movement of the floater and placing tool, it is noted that there is provision for free uninterrupted flow of water through the floater and placing tool, such entering the floater through the opening 9 and passing out through the openings 71 of the connector 68. Therefore, the presence of water in the casing does not interfere with the lowering of the floater. When the floater reaches the desired point, an upward pull is exerted upon the placing tool tending to raise the driving sleeve 1 which first closes the opening 9 at the lower end of the driving sleeve and thereafter contact between the cap 5 and carrier 10 moves upwardly the packing carrier 10 and rubbers 19. The upward movement of the driving sleeve causes the pawls 55 to engage the appropriate ratchet recesses or racks 57 and thus lock the driving sleeve 1 and gripper operator 52 against independent downward movement. The fixing of the gripper operator also fixes the grippers against relative vertical movement and as the main spring 51 is compressed in the relative upward movement of the packing carrier 10, it is apparent that the floater body is under upward tension which causes the grippers 33 to be forced into biting engagement with the casing 106. This fixes the floater against either upward or downward movement in the casing. As the movement of the packing carrier tends to move upwardly the rubbers 19 and as this upward movement is interrupted by the lower end of the spring sleeve 26, it is apparent that the continued movement tends to compress these rubbers and thereby expand them laterally into sealing engagement with the casing. The floater is thus sealed and gripped with respect to the casing and as will be apparent the channel longitudinally of the floater is closed. Thus the floater is in position to take advantage of the flotation effect of the water beneath the same as an aid in removing the casing. After the floater has been positioned, an upward pull upon the placing tool causes a relative movement of the pipe section 72 to a point to permit outward movement of the lower ends of the locking dogs 83, thereby freeing the placing tool and permitting the same to be withdrawn from the casing, leaving the floater in position. The relative positions and relations of parts of the floater, when the latter is in sealing and gripping cooperation with the casing, is indicated particularly in Figures 2 and 2ª.

When it is desired to remove the floater, the removing tool is connected with the cable and lowered until the dogs engage beneath the flange 67 on the main trip sleeve. Following this engagement, an upward pull is exerted upon the removing tool, thereby raising the main trip sleeve which moving upwardly relieves the dogs 38, which have served to fix the spring trip sleeve and floater body together, of the holding section 62, thereby permitting the spring trip sleeve to move upwardly under the influence of the springs 44 and 45 and thereby displace the pawls 55 to free the connection between the driving sleeve and the gripper operator. The cable is then operated to exert a downward jar or driving effect on the removing tool which, in this movement, engages with the driving collar 2 and through the cooperation of the driving flange 15 with the shoulder 11 on the packing carrier forces the latter downwardly relieving the compression on the rubbers and as the floater body is free and the tension on the main spring 51 has been relieved, the grippers 33 release and the rubbers return to normal condition, relieving the sealing cooperation with the casing. The grippers 33 are held up by springs 44 and 45 while the floater is being removed. The floater is now free to be removed from the casing by drawing upwardly on the removing tool as will be apparent.

In the event the floater is to be used in pulling an inner string of casing from a well in which there is little or no water, the well hole up to the bottom of the casing is plugged, the inner casing is formed with a hole near the bottom to permit water to flow from the outer casing to the inner casing, the floater is secured within the inner casing, and water is delivered between the outer and inner casings to secure the flotation effect on the bottom of the casing and assist in the removal of the inner casing.

In the event additional flotation effect is desired, tubing may be run into the casing after positioning the floater and threaded into the threads 4 of the driving collar. Water is then pumped through this tubing and through the floater, passing the valve 7, which prevents return flow, and thereby accumulating below the floater for the desired flotation effect.

If desired to pull a string of casing from a well where there is little or no water and it is also desired to utilize a water flow or circulation to loosen sanded joints of the casing, the bottom of the lower joint is plugged and a hole is cut in the casing above and adjacent such plug. Tubing is connected to the floater after placement of the latter in the casing and water pumped through the tubing and below the floater as previously described. This water accumulates below the floater for flotation effect and at the same time passes through the opening in the casing to reach the sanded joints in the casing to assist in removing the sand and mud at the joints to facilitate the removal.

*The modified floater*

The modified form of floater differs from the form previously described in that a single sleeve is provided in place of the spring trip sleeve 41 and main trip sleeve 42 and utilized for both releasing the driving sleeve from lifted position and also lifting the grippers 33. In order, however, that the modified form may be clearly understood, all details of the structure, which are largely identical with the form first described, will be at least briefly referred to.

The modified construction shows the driving sleeve 107 provided at its upper end with a driving collar 108 similar to the collar 2 of the previously described form, and presenting an abutment shoulder 109 at the lower end of the collar. At the lower end of the sleeve is a cap 110, the wall of which is formed with openings 111, a downwardly opening spring pressed valve 112 directly cooperating with the end of the sleeve. Above the cap 110, the sleeve proper is formed with an opening 113. A packing carrier 114 encircles the driving sleeve at the lower end, said carrier, except at its extreme lower portion, being spaced from the sleeve throughout its length at 115.

The driving sleeve is provided with a driving flange 116 arranged to cooperate with a shoulder formed in the interior of the packing carrier, and above such flange, the space 115 is packed, as at 117, with the packing secured by a gland 118. A nut 119 is threaded on the exterior of the packing carrier and between the upper inclined surface 120 of this nut and a retainer 121 movable on and relative to the packing carrier there are arranged packing rubbers 122 similar to the rubbers 19 described in connection with the other form of floater. The retainer 121 is carried by a sleeve 123 of comparatively short length which in turn is provided at its upper end with a lateral flange 124 designed to underlie a flange 125 on the carrier and overlie a flange 126 of a spring sleeve 127, which latter is exteriorly reinforced by bands 128.

The spring sleeve 127, which extends materially above the carrier, is interiorly provided adjacent its upper end with a spacer 129 to the lower end of which, through the medium of a lateral flange 130, is secured a spacing sleeve 131 which depends in parallel spaced relation to but terminates short of the lower end of the spring sleeve. A coil spring 132, hereinafter termed the main spring, encircles the spacer 131 bearing against the under surface of the spring sleeve 127 and bears at its respective ends on the flange 125 on the carrier and the flange 130 on the spacer.

Secured to the outside of the spring sleeve 127 are friction slides 133, in the form of elongated spring strips, secured at their respective ends to the outer surface of the spring sleeve 127. These strips, which are arranged circumferentially of the spring sleeve, are provided in such number and so tensioned as to normally present a maximum projection at their substantial mid-lengths exceeding the interior diameter of the casing in which the floater is to be placed. When the floater is in position, it may obviously be moved even against the tension of these strips, but the primary function of such strips or slides is to support the floater at any desired point of rest in the casing; that is, the slides will frictionally carry the weight of the floater.

A trip sleeve 134 is arranged to slidably encircle the driving sleeve 107, and encircling the trip sleeve and terminally secured at its lower end, as at 135, to the upper end of the spring sleeve 127 is a floater body 136. The floater body is formed with diametrically opposed pairs of vertically ranging slots or channels 137, the inner or bottom walls of which incline upwardly and inwardly. Slidably mounted in each slot 137 is a gripper 138, similar to the grippers previously described.

Slidably mounted on the trip sleeve 134 below the floater body is a spider member 139 from which at opposed diametrically opposite points extend spider arms 140. These arms are guided in slots 141 in the floater body and are formed at their upper ends with lateral flanges 142 to cooperate with recesses 143 in the lower ends of the grippers 138. Above the spider body 139, the trip sleeve is provided with a fixed collar 144 operating in an interior enlargement 145 in the floater body and cooperating with a shoulder 146 at the upper end of the enlargement.

The trip sleeve is held from rotation relative to the floater body through the medium of vertically disposed slots 147 in which engage pins 148 threaded in the floater body, there being a sufficient number of pins and slots to maintain the guiding cooperation. A spring 149 is loosely coiled about the trip sleeve, bearing between a collar 150 secured at the lower end of the sleeve and the spider member 139, this spring being guided between the trip sleeve and spacer 131.

As will appear from the later described operation, it is necessary during the lowering of the floater to hold the trip sleeve in its down position relative to the driving sleeve; that is, substantially at the limit of expansion of the spring 149 while when the floater is set for removal, it is necessary that the trip sleeve be held in its upper position. To provide means for locking the trip sleeve in these respective positions, the floater body is provided, preferably at opposed diametrically opposite points, with locking pins 151 having cone-shaped terminals and spring operated by springs 152 in openings 153 leading through the floater body.

The pins are preferably in the form of hollow-ended members in which is seated the operating spring, the opposite end of the spring bearing against a plug threaded in the outer end of the opening 153. The trip sleeve at a point in alignment with the plugs when the sleeve is in down position, is provided with cone-shaped depressions 154 to received the ends of the pins and at points in alignment with the locking pins when the sleeve is in up position, said sleeve is formed with openings 155 through which the pins can bodily project, the driving sleeve being channeled at 156 to permit the locking pins to have a full locking projection through the openings 155.

Slidably cooperating with and encircling the trip sleeve above the floater body is a gripper operator 157 provided in the form of a cylindrical casting from which depend pivoted links 158, the lower ends of which are pivotally connected to the grippers 138, as at 159. Pivotally supported in offsets 160 of the gripper operator are pawls 161 influenced inwardly by springs 162 with their operative ends formed to cooperate with serrations or ratchet recesses 163 in the driving sleeve. Four such pawls 161 are preferably provided with diametrically opposed pairs and it is preferred that the pawls 161 be arranged with one pair on a slightly higher plane vertically than the other pair, so that under slightly different movements of the driving sleeve, at least one pair of pawls will be in position to interlock with such ratchet recesses.

The trip sleeve is formed at appropriate points with elongated slots 164 through which in a predetermined relative position of the driving sleeve and trip sleeve, the pawls may project to cooperate with the ratchet recesses. The lower walls or margins of these slots act as trips to displace the pawls from locking position in the relative upward movement of the trip sleeve. The tripping sleeve is provided at its upper end with a collar 165 forming an abrupt shoulder 166 with the trip sleeve and inclined upwardly and inwardly relative to the trip sleeve at its upper end, as at 167.

The modified form of placing tool

The placing tool, which of course is equally effective with both forms of floater, includes a casting 168 formed at one end with a connector 169 for connecting the placing tool to the cable and at the opposite end with a body 170, the casting being formed with a central bore 171 below the connector and extending through the body and having lateral openings or outlets 172 above the body. A sleeve union 173 is connected to and depends below the body and terminally supports the body sleeve 174 of the placing tool, which latter throughout the upper portion is reinforced by a sleeve or spacer 175 to keep the parts in place.

Arranged within and movable longitudinally with respect to the body sleeve 175 is an operating sleeve 176 provided at its upper end with a collar 177 presenting an external shoulder between which and a flange 178 carried by the body sleeve at the lower end of the reinforcing sleeve are arranged inner and outer coil springs 179, the tension of which is at least equal to the tension of the main spring 132 of the floater. The body 170 of the connector casting is formed with threaded openings 180 through which extend set-screws 181 adapted to bear upon the upper end of the operating sleeve 176 for a purpose which will later appear.

The lower end of the operating sleeve is provided with a member 182 having an annular rib 183, and locking dogs 184 are formed on their inner edges with recesses 185 to more or less loosely engage the rib 183. These locking dogs are cut away on their inner surfaces to present lower engaging shoulders 186 and on their outer surfaces are similarly cut away at 187 to present lower laterally extended bearing edges 188. The dogs are guided in longitudinal movement in slots 189 formed in a sleeve 190 secured within the body sleeve 174 at the lower end, a reinforcing sleeve 191 being arranged inwardly of the guiding sleeve at the lower end, if desired. The guiding sleeve 190 and the body sleeve 174 are formed at appropriate points with registering openings 192 through which the lower enlarged ends of the dogs may project when the dogs have been raised a determined distance, thus permitting the lower engaging shoulders 186 to move outwardly to a release position, as will later appear.

As the operating sleeve must be held in fixed relation to the body sleeve to insure the desired placing operation, there is provided a latching means between such elements which includes a ball retainer 193 recessed at 194 to receive and support steel balls 195. The operating sleeve is provided with a lateral enlargement 196 formed with an annular recess 197 into which the balls are adapted to seat when in locking position. The ball retainer is reduced in thickness above the balls to provide for the reception of an operating spring 198 which bears between the shoulder on the retainer formed by the reduced portion and the flange 178 of the body sleeve. The retainer below the shoulder 199 formed by the enlargement 196 is of reduced diameter to fit the operating sleeve, thereby providing a shoulder 200 to be engaged by the shoulder 199 to depress the retainer 193 in the operation of the parts. The body sleeve surrounding the ball retainer is provided with a sleeve-like member 201, the lower inner edge of which is inclined at 202 to form a ball cone.

Operation

It is to be understood that the modified form of placer is to be positioned in the casing in a manner similar to that described in connection with the preceding form and that the initial operation of such placement is connecting the placing tool to the floater.

The placing tool is passed over the driving collar 108 and the driving sleeve 107 of the floater, the enlargements 188 of the dogs 184 being projected at this time through the openings 192 in the body sleeve of the placing tool. After thus positioning the placing tool, the lower ends of the dogs are forced inwardly through the openings 192, so that the shoulders 186 of the dogs are beneath the shoulder 109 of the driving collar 108. The screws 181 are then actuated to force the operating sleeve 176 downwardly, causing the dogs to ride in the grooves 189 of the guiding sleeve 190, maintaining the locking cooperation of the dogs. The screws 181 are threaded inwardly to compress the springs 179 and when said springs have reached the desired compression, a rod is inserted through openings 203 in the body sleeve and the ball retainer 193 is moved upwardly against the tension of the spring 198 until the balls, riding on the incline 202 of the cone 201, are forced into the channel 197 of the operating sleeve, thus locking the sleeve against the tension of springs 179. The cable is then operated to jar the floater down into the casing to the desired point, as previously described, the screws 181 having meanwhile been removed.

When it is desired to release the placing tool from the floater, the placing body is moved upwardly to an extreme position, it being obvious that the connection between the operating sleeve of the placing tool and the floater prevents the operating sleeve from following this upward movement of the body sleeve. As the body sleeve moves upwardly, a circular abutment 204 engages the lower end of the retainer 193 and forces such retainer upwardly. This causes the balls 195 to be moved out of the operating sleeve recesses 197 due to the upward inclined edge of such recesses and the fact that the retaining cone 201 has moved away from the balls. The operating sleeve is thus freed from connection with the body sleeve by the release of the balls which are in effect a latching means. The pull on the cable is then released, permitting the sleeve body to move downwardly under the expansion of the springs 179. This relative movement between the operating sleeve and body sleeve is not interfered with by the latching balls as immediately the balls are released from the operating sleeve, the spring 198 moves the ball retainer to its lowermost position which precludes the reengagement of the balls, as they are now below the ball cone 201. In this relative movement of the body sleeve and operating sleeve, the dogs 184 move to align their lower enlargements 188 with the openings 192 in the body sleeve and as the inner shoulders 186 of the dogs are somewhat inclined, it is apparent that a slight upward pull on the placing tool will cause the shoulder 109 on the driving collar 108 to force the lower ends of the dogs outwardly, releasing the connection between the placing tool and floater.

*Operation of floater*

The operation of the floater is substantially identical in its essential details with that described in connection with the first form except that in the modified form the trip sleeve 134 performs the dual function of tripping the pawls 161 from the position of locking the driving sleeve, as shown in Figures 16 and 16ª and of lifting the grippers 138. The fixed collar 144 on the trip sleeve also serves the dual function of causing the movement of the sleeve to be communicated to the floater body 136 during the removal of the floater and prevents spring 149 from acting to lift the spider 139 when the floater is in set position in the casing, for in this position the trip sleeve is held in its relatively lowered position by cooperation of the locking pins 151 with the recesses 154, at which time the collar 144 maintains the spider in its lowermost position. As the sleeve 107 forces down the floater body 136, the grippers 138 will be driven up and spring 149 will then force the grippers 138 to extreme release or top position. Blocks or keys 205 are fitted between the top of reducer bushing 135 and the floater body 136 to keep the tripping spider arms 140 from riding on the threads of the reducer bushing 135.

What we claim to be new is:

1. In a casing floater, a driving sleeve, a fluid by-pass through the floater, means controlled by the relative position of the sleeve for controlling the by-pass against upward flow of fluid through the by-pass, and means to permit downward flow of fluid through the by-pass independently of the position of the sleeve.

2. In a casing floater, a hollow driving sleeve forming a fluid by-pass through the floater, an opening through the sleeve leading to the by-pass adapted to be closed when the driving sleeve is in elevated position, and a downwardly opening valve controlling the by-pass.

3. In a casing floater, a casing gripping means, a driving sleeve through which the casing may be placed, means whereby relative upward movement of the driving sleeve will operate the gripping means, said floater being formed with a fluid by-pass, means governed by the position of the driving sleeve to control the upward flow of fluid through said by-pass in accordance with the relative position of the driving sleeve, and a downwardly opening valve for the by-pass carried by the driving sleeve.

4. In a casing floater, casing sealing means, casing gripping means, and an operating member for the gripping means responsive to a force in excess of that required to lift the floater, whereby the floater may be moved longitudinally of the casing without liability of setting the gripping means.

5. In a casing floater, casing sealing means, casing gripping means, and a spring for actuating the gripping means, said spring being tensioned to resist operation by a force less than that required to lift the floater.

6. In a casing floater, casing gripping means, a driving sleeve, means operated by relative movement of the sleeve in one direction to automatically set the gripping means, means for locking the driving sleeve in such operated relation, a member to release the lock at will, and spring means released for operation in the movement of such member to positively actuate the gripping means to released position.

7. In a casing floater, casing gripping means, a driving sleeve, means operated by relative movement of the sleeve in one direction to automatically set the gripping means, means for locking the driving sleeve in such operated relation, a member to release the lock at will, spring means released for operation in the movement of such member to positively actuate the gripping means to released position, and means for normally locking the member against operation.

8. In a casing floater, a floater body, a driving sleeve operative therethrough, gripping means carried by the body and movable relative thereto, the gripping means and body having a wedging cooperation to maintain the gripping means in set or released position in accordance with the relative disposition of the body and gripping means, a member slidable on the driving sleeve and connected to the gripping means, means for moving the driving sleeve upwardly relative to the body, means for locking said member and sleeve following such upward movement of the sleeve, and means set in motion in the relative upward movement of the sleeve to move the body relative to the sleeve to thereby induce a wedging action of the grippers.

9. In a casing floater, a driving sleeve, a packing carrier slidable on the sleeve, sealing rubbers carried by the carrier, a floater body slidable on the sleeve, grippers having wedging cooperation with the body, a gripper operator connected with the grippers and slidable on the sleeve, a spring casing connected to and depending from the body, a spring housed within said casing and bearing between the packing carrier and the floater body, and means for locking the sleeve and gripper operator relative to each other following upward movement of the sleeve whereby to compress the spring to independently operate the floater body to compel wedging action of the grippers and to compress the rubbers to expand them into sealing cooperation with the casing.

10. In a casing floater, a driving sleeve, a packing carrier slidable on the sleeve, sealing rubbers carried by the carrier, a floater body slidable on the sleeve, grippers having wedging cooperation with the body, a gripper operator connected with the grippers and slidable on the sleeve, a spring casing connected to and depending from the body, a spring housed within said casing and bearing between the packing carrier and the floater body, and means for locking the sleeve and gripper operator relative to each other following upward movement of the sleeve whereby to compress the spring to independently operate the floater body to compel wedging action of the grippers and to compress the rubbers to expand them into sealing cooperation with the casing, said driving sleeve having an opening at its lower end normally permitting inflow of liquid, said opening being sealed following the relative upward movement of the sleeve.

11. In a casing floater, a driving sleeve, a packing carrier movable on the sleeve, means whereby the sleeve may impart upward or downward movement to the carrier, packing rubbers carried by the carrier, a floater body slidable on the sleeve, grippers having wedging cooperation with and carried by said body, a gripper operator slidable on the sleeve above the body and connected with the grippers, a spring casing carried by and depending from the floater body, the lower end of the casing being arranged to form a compressing abutment for the rubbers in the upward movement of the packing carrier, a spring interposed between the packing carrier and the floater body and put under tension in the upward movement of the carrier, and means for locking the gripper operator and sleeve together following that predetermined upward movement of the sleeve which will elevate the packing carrier to expand the rubbers and tension said spring.

12. In a casing floater, a driving sleeve, a packing carrier movable on the sleeve, means whereby the sleeve may impart upward or downward movement to the carrier, packing rubbers carried by the carrier, a floater body slidable on the sleeve, grippers having wedging cooperation with and carried by said body, a gripper operator slidable on the sleeve above the body and connected with the grippers, a spring casing carried by and depending from the floater body, the lower end of the casing being arranged to form a compressing abutment for the rubbers in the upward movement of the packing carrier, a spring interposed between the packing carrier and the floater body and put under tension in the upward movement of the carrier, and pawls for locking the gripper operator and sleeve together following that predetermined upward movement of the sleeve which will elevate the packing carrier to expand the rubbers and tension said spring.

13. In a casing floater, a driving sleeve, a packing carrier movable on the sleeve, means whereby the sleeve may impart upward or downward movement to the carrier, packing rubbers carried by the carrier, a floater body slidable on the sleeve, grippers having wedging cooperation with and carried by said body, a gripper operator slidable on the sleeve above the body and connected with the grippers, a spring casing carried by and depending from the floater body, the lower end of the casing being arranged to form a compressing abutment for the rubbers in the upward movement of the packing carrier, a spring interposed between the packing carrier and the floater body and put under tension in the upward movement of the carrier, pawls for locking the gripper operator and sleeve together following that predetermined upward movement of the sleeve which will elevate the packing carrier to expand the rubbers and tension said spring, spring means for operating the floater body to release the grippers, a pin for locking the spring means against operation, and means whereby said pin may be disconnected and said pawls tripped.

14. In a casing floater, a driving sleeve, a packing carrier movable on the sleeve, means whereby the sleeve may impart upward or downward movement to the carrier, packing rubbers carried by the carrier, a floater body slidable on the sleeve, grippers having wedging cooperation with and carried by said body, a gripper operator slidable on the sleeve above the body and connected with the grippers, a spring casing carried by and depending from the floater body, the lower end of the casing being arranged to form a compressing abutment for the rubbers in the upward movement of the packing carrier, a spring interposed between the packing carrier and the floater body and put under tension in the upward movement of the carrier, pawls for locking the gripper operator and sleeve together following that predetermined upward movement of the sleeve which will elevate the packing carrier to expand the rubbers and tension said spring, a spring trip sleeve slidably encircling the driving sleeve, a pin for locking said spring trip sleeve relative to the floater body, and a spring for moving said spring trip sleeve relative to the body when the pin is released.

15. In a casing floater, a driving sleeve, a packing carrier movable on the sleeve, means whereby the sleeve may impart upward or downward movement to the carrier, packing rubbers carried by the carrier, a floater body slidable on the sleeve, grippers having wedging cooperation with and carried by said body, a gripper operator slidable on the sleeve above the body and connected with the grippers, a spring casing carried by and depending from the floater body, the lower end of the casing being arranged to form a compressing abutment for the rubbers in the upward movement of the packing carrier, a spring interposed between the packing carrier and the floater body and put under tension in the upward movement of the carrier, pawls for locking the gripper operator and sleeve together following that predetermined upward movement of the sleeve which will elevate the packing carrier to expand the rubbers and tension said spring, a trip sleeve slidable on the driving sleeve, means for locking the trip sleeve and floater body, spring means held under tension while the trip sleeve is locked, means on the trip sleeve for releasing the lock, means on the trip sleeve for releasing the pawls to free the floater body, said trip sleeve being manually moved for such release action, and means on the trip sleeve for engaging and operating the floater body to release the grippers.

16. In a casing floater, a driving sleeve, casing gripping means, casing sealing means, means operated by independent movement of the driving sleeve for actuating the sealing means and gripping means, and a placing tool cooperating with the driving sleeve to place the floater and operate the sleeve, said tool including means to automatically release connection with the driving sleeve following the setting of the gripping means of the floater.

17. In a casing floater, a driving sleeve, a packing carrier movable on the sleeve, means whereby the sleeve may impart upward or downward movement to the carrier, packing rubbers carried by the carrier, a floater body slidable on the sleeve, grippers having wedging cooperation with and carried by said body, a gripper operator slidable on the sleeve above the body and connected with the grippers, a spring casing carried by and depending from the floater body, the lower end of the casing being arranged to form a compressing abutment for the rubbers in the upward movement of the packing carrier, a spring interposed between the packing carrier and the floater body and put under tension in the upward movement of the carrier, pawls for locking the gripper operator and sleeve together following that predetermined upward movement of the sleeve which will elevate the packing carrier to expand the rubbers and tension said spring, a trip sleeve slidable on the driving sleeve, means for locking the trip sleeve and floater body, spring means held under tension while the trip sleeve is locked, means on the trip sleeve for releasing the pawls to free the floater body, said trip sleeve being moved manually for such release action, means on the trip sleeve for engaging and operating the floater body to release the grippers, and a removing tool automatically engageable with and adapted to operate the trip sleeve.

18. In a casing floater, a driving sleeve, casing-gripping means, casing sealing means, means operated by independent movement of the driving sleeve for actuating the sealing means and gripping means, a trip sleeve slidable on the driving sleeve, means for fixing the trip sleeve relative to the driving sleeve in either of two positions, a spring held under tension in one relative position of the trip sleeve, said spring being permitted to expand in the other relative position of the trip sleeve, and means operated by the spring during its expansion to initially move the grippers toward release position.

19. In a casing floater, a driving sleeve, casing gripping means, casing sealing means, means operated by independent movement of the driving sleeve for actuating the sealing means and gripping means, a trip sleeve slidable on the driving sleeve, means for fixing the trip sleeve relative to the driving sleeve in either of two positions, a spring held under tension in one relative position of the trip sleeve, said spring being permitted to expand in the other relative position of the trip sleeve, and a spider operated by the spring during its expansion to initially move the grippers toward release position.

20. In a casing floater, a driving sleeve, casing gripping means, casing sealing means, means operated by independent movement of the driving sleeve for actuating the sealing means and gripping means, a trip sleeve slidable on the driving sleeve, means for fixing the trip sleeve relative to the driving sleeve in either of two positions, a spring held under tension in one relative position of the trip sleeve, said spring being permitted to expand in the other relative position of the trip sleeve, a spider operated by the spring during its expansion to initially move the grippers toward release position, and means on the trip sleeve to hold the spider against movement by the spring in one relative position of the trip sleeve.

21. In a casing floater, a driving sleeve, casing gripping means, casing sealing means, means operated by independent movement of the driving sleeve for actuating the sealing means and gripping means, a trip sleeve slidable on the driving sleeve, means for fixing the trip sleeve relative to the driving sleeve in either of two positions, a spring held under tension in one relative position of the trip sleeve, said spring being permitted to expand in the other relative position of the trip sleeve, a spider operated by the spring during its expansion to initially move the grippers toward release position, and means on the trip sleeve to hold the spider against movement by the spring in one relative position of the trip sleeve, said trip sleeve carried means serving to actuate the floater body in the other relative position of the trip sleeve.

In testimony whereof we affix our signatures.

ELI H. MECHLING.
JOHN R. HOSKINS.